United States Patent [19]

Imada et al.

[11] 4,247,577
[45] Jan. 27, 1981

[54] METHOD FOR PREPARING SHAPED ARTICLES OF A VINYL CHLORIDE RESIN HAVING IMPROVED SURFACE PROPERTIES

[75] Inventors: Kiyoshi Imada, Omiya; Susumu Ueno; Osamu Sodeyama, both of Ibaragi, all of Japan

[73] Assignee: Shin-Etsu Chemical Co., Ltd., Japan

[21] Appl. No.: 41,625

[22] Filed: May 23, 1979

[30] Foreign Application Priority Data

May 31, 1978 [JP] Japan ............................... 53-65423

[51] Int. Cl.³ .............................................. B05D 3/14
[52] U.S. Cl. ...................................... 427/40; 204/169; 427/385.5
[58] Field of Search ............... 427/39, 40, 38, 322; 204/169; 428/447, 451

[56] References Cited

U.S. PATENT DOCUMENTS

| | | | |
|---|---|---|---|
| 3,255,099 | 6/1966 | Wolinski | 204/169 |
| 3,274,089 | 9/1966 | Wolinski | 204/169 |
| 3,477,902 | 11/1969 | Tomasino et al. | 156/272 |
| 3,829,324 | 8/1974 | Blais et al. | 427/44 |

FOREIGN PATENT DOCUMENTS

50-107078 8/1975 Japan ................................... 427/40

*Primary Examiner*—John H. Newsome
*Attorney, Agent, or Firm*—McGlew and Tuttle

[57] ABSTRACT

A novel method is provided for placing a covering layer of a cured organopolysiloxane composition onto the surface of a shaped article of a vinyl chloride resin in order to improve or mask the defective surface properties of articles made of vinyl chloride resins. The method comprises treating the surface of a vinyl chloride resin article with a low temperature plasma of gas, placing a covering layer of a curable organopolysiloxane composition on the so-treated surface of the articles and subjecting the article with the curable organopolysiloxane composition to curing conditions for the organopolysiloxane composition. The adhesive bonding between the vinyl chloride resin article and the layer of the cured organopolysiloxane composition, e.g. cured room temperature-vulcanizable silicone rubbers, is so strong and durable that very long service life of the article is ensured in a variety of application fields.

9 Claims, No Drawings

METHOD FOR PREPARING SHAPED ARTICLES OF A VINYL CHLORIDE RESIN HAVING IMPROVED SURFACE PROPERTIES

BACKGROUND OF THE INVENTION

The present invention relates to a novel shaped article composed of a vinyl chloride (hereinafter referred to as VC) resin having a covering layer comprising a cured organopolysiloxane composition. The invention also relates to a method for the preparation of same.

VC resins belong to a class of the most widely employed thermoplastic synthetic resins for the fabrication of shaped articles of both the hard or rigid type and the soft or flexible type according to the absence or presence of a substantial amount of a plasticizer in the formulation of the molding composition. That is to say, the flexibility and the mechanical strengths, especially, impact strength, of a shaped article composed of VC resins can be improved by formulating substantial amounts of a plasticizer or a rubbery polymeric substance in the molding composition so that the fields of application fields of of the VC resins have been expanded to include medical instruments, wrapping materials for various goods, e.g. foodstuffs, insulating materials for electric wires and cables, materials used in agriculture and construction work and the like.

In order to comply with the requirements of a variety of the application fields above mentioned, above VC resins are usually blended, in addition to the above mentioned plasticizers and rubbery polymeric substances, with various kinds of additives such as fillers, anti-oxidants, ultraviolet light absorbers, anti-static agents, anti-fogging agents, coloring agents, crosslinking accelerators and the like according to the desired properties of the shaped articles.

One of the major problems or defects in the shaped articles shaped out of VC resins is, even setting aside the insufficient heat resistance inherent in VC resins, that the plasticizer and other additives contained therein migrate after a time toward the surface of the shaped article and eventually bleed or bloom on the surface of the article, thus bringing about denaturation or deterioration of the surface layer as well as a loss in the beauty of the appearance of the article with a shortened serviceable life of these articles. Moreover, the bleeding or blooming of the additives on the surface is very disadvantageous from the standpoint of health especially when the additives are toxic or, at least, have unpleasant side effects on the human body. This problem is especially serious when the shaped articles are used in medical applications or come into contact with foodstuffs or drinks.

One of the promising methods of solving the above problems is to provide a coating layer or a covering layer of a polymeric material with no sanitary problems onto the surface of the shaped article of the VC resin.

Among the polymeric materials directed to such a method, organopolysiloxane compositions or so-called silicones such as silicone rubbers belong to the most interesting class of polymers with their high heat resistance as well as their inherent lack of intoxicity to the human body, so that very interesting and useful shaped articles can be obtained if the shaped articles of VC resins are provided with an adequate covering or coating layer of an organopolysiloxane composition.

One of the major difficulties in the above method to obtain a composite product of a VC resin and an organopolysiloxane composition is in obtaining good adhesion between the two two kinds of polymers with so different chemical properties so as to have a satisfactory integration. It is well known that the adhesion of a silicone can be improved by the use of a primer which is applied to the surface before the silicone is bonded thereto. Even with very careful selection and application of a primer, however, no satisfactory adhesion can be obtained between the surface of a VC resin article and an organopolysiloxane composition and, if eventual bonding is obtained therebetween, the adhesive bonding strength is so small and void of durableness that the covering layer of the organopolysiloxane composition readily comes off the surface of the VC resin article with an insignificant pulling or peeling force exerted thereto. Thus no composite products of a VC resin shaped article with a covering layer of an organopolysiloxane composition are available hitherto to the satisfaction of the needs as described above.

The above described problem of poor adhesive bonding between a cured organopolysiloxane composition and the surface of a shaped article of a VC resin is even more difficult to solve with a two-package type room temperature vulcanizable organopolysiloxane rubber than with a one-package type one, the former rubber composition being desirable when larger mechanical strengths are required for the layer of the cured organopolysiloxane composition.

SUMMARY OF THE INVENTION

It is therefore an object of the present invention to present a novel shaped article of a VC resin provided with a covering layer of a cured organopolysiloxane composition and a method for the preparation of same.

Another object of the present invention is to present a method for preparing a shaped article of a VC resin provided with a covering layer of a cured organopolysiloxane composition very firmly bonded to the surface of the VC resin shaped article even when the organopolysiloxane composition is a two-package type room temperature vulcanizable organopolysiloxane rubber.

In particular, the method of the present invention comprises the steps of (a) subjecting a shaped article of a VC resin to a treatment with low temperature plasma of a gas, (b) providing a covering layer of a curable organopolysiloxane composition onto the surface of the shaped article having been subjected to the treatment with low temperature plasma, and (c) subjecting the shaped article with the covering layer of the curable organopolysiloxane composition to a curing condition of the curable organopolysiloxane composition.

Being imparted with the excellent surface properties of the organopolysiloxane composition, the shaped article obtained by the above method is quite free from the problems of bleeding or blooming of the additives contained therein and the adhesion between the surface of the VC resin article and the covering layer of the cured organopolysiloxane composition is thus strong and durable giving rise to no peeling of the covering layer even in a very prolonged use of the article in an adverse condition.

DETAILED DESCRIPTION OF THE PREFERRED EMBODIMENTS

The details of the present invention are now explained in the following description.

The VC resin used in the present invention as the main component of the shaped article may be any one of the VC based resins including homopolymeric VC resins and copolymeric VC resins obtained by the copolymerization of VC with one or more of copolymerizable monomers insofar as VC is the major monomeric component exceeding, say, 50% by weight.

The comonomers to be copolymerized with VC are exemplified by vinyl esters such as vinyl acetate, vinyl ethers such as vinylethyl ether, acrylic acid and methacrylic acid or esters thereof such as methyl methacrylate, maleic acid and fumaric acid or esters thereof, maleic anhydride, aromatic vinyl compounds such as styrene, vinylidene halides such as vinylidene chloride, acrylonitrile, methacrylonitrile and olefins such as ethylene and propylene.

In order to improve the mechanical properties, e.g. impact strength, VC resins are sometimes blended with other polymeric substances, in most cases rubbery elastomers, as exemplified by urethane elastomers, ethylenevinyl acetate copolymers, acrylonitrile-butadiene copolymers, styrene-acrylonitrile copolymers, methyl methacrylatebutadiene copolymers, acrylonitrile-styrene-butadiene copolymers, polyamide resins, polycaprolactams, epoxymodified polybutadiene resins and the like. These additive polymers are used preferably in an amount not exceeding 50 parts by weight per 100 parts by weight of the VC based resin.

There are no specific limitations in the additives and any conventional additives may be admixed with the VC resins including plasticizers, stabilizers, lubricants, fillers, anti-oxidants, ultraviolet light absorbers, antistatic agents, anti-fogging agents, coloring agents and the like.

The method for shaping the above mentioned VC resins with optional additives is also not limitative including injection molding, extrusion molding, blow molding, inflation process, vacuum forming calendering, compression molding and the like in accordance with the shapes of the desired articles such as films, sheets, plates, pipes, bottles or any other complicated forms.

The treatment of the shaped articles of the VC resins is carried out in an atmosphere of low temperature plasma, i.e. gaseous atmosphere made up of charged particles, of a gas with or without polymerizability in the plasma conditions, of which the pressure of the gaseous atmosphere is in the range as undermentioned. Gases suitable for the purpose are exemplified by helium, neon, argon, nitrogen, oxygen, air, nitrous oxide, nitrgen dioxide, carbon monoxide, carbon dioxide, hydrogen, chlorine, hydrogen chloride, sulfur dioxide, hydrogen sulfide and the like. These inorganic gases are preferred due to the absence of polymerizability in the plasma condition to certain organic gases which may form a resinous matter in the plasma.

The pressure of the gas in the plasma generating apparatus is preferably in the range from 0.001 Torr to 10 Torr or, more preferably, from 0.01 Torr to 1 Torr in order to obtain stable plasma generation. The low temperature plasma is generated by use of a conventional apparatus for glow discharge or any other types of electric discharge and the frequency of the power supplied to the apparatus is not limitative ranging from a low frequency of, said, 50 to 60 Hz, to a high frequency of, say 10 to 100 MHz or a frequency of microwave region of several thousands of MHz. The electrodes are also not limitative with respect to their shapes including coiled electrodes, belt-like or ring-like electrodes, cylindrical electrodes, plate electrodes, cavity electrodes and the like. The power to be supplied to the electrodes depends on the dimension of the apparatus or the space where low temperature plasma is to be generated but a power of 10 to 500 watts is usually sufficient. The time for the plasma treatment depends on the intensity of the plasma and is selected in the range from a few seconds to several tens of minutes.

The shaped article of the VC resin having been subjected to the treatment with low temperature plasma under the above described conditions are then provided with a covering layer of a curable organopolysiloxane composition on the surface thereof.

The curable organopolysiloxane compositions suitable for the purpose include a wide variety of silicones capable of yielding cured compositions with rigidity such as silicone varnishes and cured compositions with flexibility such as silicone rubbers. It is essential, however, that the curing temperature of the curable organopolysiloxane composition is relatively low so as that the thermal degradation of the VC resin of the shaped article can be avoided in the subsequent curing step. In this connection, a room temperature-vulcanizable (RTV) silicone rubber is recommended with a flexible covering layer is desired.

The RTV silicone rubbers are classified into several types according to the mechanism of crosslink formation by, for example, the condensation reaction or addition reaction. These curable organopolysiloxane compositions are well known in the art of silicones.

In particular, RTV silicone rubber compositions are roughly classified into two-package type ones and one-package type ones according to the storability or pot life after admixture of the curing catalyst component for the condensation reaction to form crosslinks. The reaction in the former class proceeds by the condensation between silanol groups with formation of condensation water or between a silanol group and an alkoxy group with formation of an alcohol as the condensation product or by the dehydrogenation reaction between a silicon-bonded hydrogen atom and a silanol group while the compositions of the latter class are classified according to the kind of the condensation product, viz. an alcohol, amine, acetic acid and oxime, formed from the functional groups pertaining to the condensation reaction. Generally speaking, the RTV silicone rubber compositions of the former class can give stronger cured compositions although the strength of adhesive bonding to the surface of other kind of materials is poorer than with the compositions of the latter class.

When the plasma-treated surface of the shaped articles of the VC resin is coated with these curable organopolysiloxane compositions, no primer is needed when the plasma treatment has been performed adequately. The thickness of the covering layer of the curable organopolysiloxane composition depends on the particular requirement for the finished product ranging, for example, from a few micrometers to several millimeters or larger according to need.

The shaped articles thus covered with a covering layer of the curable organopolysiloxane composition is then subjected to the curing condition of the curable organopolysiloxane composition. The particular curing conditions depend on the types of the curable organopolysiloxane compositions. For example, the shaped article with the covering layer is merely kept standing at room temperature for one to several days when the curable organopolysiloxane composition is a RTV silicone rubber but it is optional to heat the article to a somewhat elevated temperature in order to accelerate the curing of the composition taking care to avoid the thermal degradation of the VC resin. After completion of the curing, the layer of the cured organopolysiloxane composition is firmly bonded to the surface of the shaped article of the VC resin so that the articles prepared in accordance with the inventive method have a long serviceable life without the danger of peeling of the cured organopolysiloxane layer in a variety of application fields utilizing the excellent surface characteristics of the organopolysiloxane compositions. For example, they are suitable for preparing medical wares such as bags for blood storage, composite films for wrapping and electronic materials.

Following are the examples to show the adhesive bonding strength obtained in accordance with the inventive method between the surface of the shaped article of a VC resin and the cured covering layer of an organopolysiloxane composition.

In the following examples, parts are all expressed in parts by weight.

EXAMPLE 1.

A blend composed of 100 parts of a homopolymeric VC resin with an average degree of polymerization of about 1300 (TK-1300, a product of Shin-Etsu Chemical Co., Japan), 50 parts of dioctyl phthalate, 2 parts of calcium stearate and 2 parts of zinc stearate was milled on a roller mill at 160° C. for 10 minutes into a homogeneous resin compound, which was then molded by press at 165° C. into a sheet of 1 mm thickness.

Two pieces of the so-obtained sheet were placed in an apparatus for plasma generation and the surface of the pieces of sheet were treated with low temperature plasma generated by applying a high frequency voltage of 13.65 MHz with a power of 50 watts under a flow of argon with a pressure of 0.2 Torr for 10 minutes.

Test specimens were prepared in the manner as described below with two strips each of 25 mm wide and 100 mm long cut from the thus plasma-treated VC resin sheet or the same VC resin sheet before plasma treatment. Thus, two strips were bonded at the opposite end portions of 10 mm length by sandwiching a 2 mm layer of a one-package type RTV silicone rubber composition curable by the deoximation reaction (KE 45RTV, a product of Shin-Etsu Chemical Co., Japan) and kept standing at room temperature for 7 days to cure the silicone rubber composition.

The shearing adhesive bonding strength between the surface of the VC resin strips and the cured RTV silicone rubber composition was determined by pulling apart two strips of the VC resin sheet with a testing machine for tensile strength. According to this test, it was found that the strength with the plasma-treated VC resin sheet was not measurable due to breakage at 18.2 kg/cm$^2$ within the layer of the cured silicone rubber composition while the strength with the untreated VC resin sheet was 4.2 kg/cm$^2$.

EXAMPLE 2.

A rigid plate of 2 mm thickness was prepared by molding a composition composed of 100 parts of a VC resin (TK-1300), 3 parts of calcium stearate and 0.2 part of stearic acid with a press.

The plate was placed in the same apparatus for plasma generation as used in Example 1 and the surface was treated with low temperature plasma similarly but with carbon monoxide as the plasma gas, a pressure of 0.5 Torr, a power of 200 watts and a time of treatment of 5 minutes.

The test for adhesive bonding strength was undertaken in the same manner as in Example 1 with the same RTV silicone rubber cured as sandwiched between two plates of the above prepared plasma-treated VC resin plates or untreated plates of the same VC resin composition to find that the layer of the cured RTV silicone rubber became broken with the plasma-treated plates at a tension of 18.2 kg/cm$^2$ while the adhesive bonding strength with the untreated plates was 5.0 kg/cm$^2$.

EXAMPLE 3.

A plate of 2 mm thickness was prepared by molding a composition composed of 100 parts of a VC-vinyl acetate copolymeric resin (SC-500T, a product of Shin-Etsu Chemical Co.) which is a copolymer of 88% by mole of VC and 12% by mole of vinyl acetate, 3 parts of calcium stearate and 0.2 part of stearic acid with a press.

The above prepared plate was placed in the same apparatus for plasma generation as used in Example 1 and the surface was treated with low temperature plasma similarly but with a mixed gas of 10% by volume of oxygen and 90% by volume of carbon monoxide as the plasma gas, a pressure of 0.3 Torr, a power of 70 watts and a time of treatment of 10 minutes.

The test for adhesive bonding strength was undertaken in the same manner as in Example 1 with a one-package type RTV silicone rubber (KE 44RTV, a product by Shin-Etsu Chemical Co.) cured as sandwiched between two of the above obtained plasma-treated plates or the untreated plates of the same copolymeric resin composition to find that the layer of the cured RTV silicone rubber became broken with the plasma-treated plates at a tension of 14.8 kg/cm$^2$ while the adhesive bonding strength was 2.8 kg/cm$^2$ with the untreated plates.

EXAMPLE 4

A flexible sheet of 1 mm thickness was prepared with a composition composed of 100 parts of a VC resin (TK-1300), 40 parts of dioctyl phthalate, 3 parts of calcium stearate and 0.1 part of stearic acid.

The sheet was placed in the same apparatus for plasma generation as used in Example 1 and the surface was treated with low temperature plasma similarly but with oxygen as the plasma gas, a pressure of 0.4 Torr, a power of 150 watts and a time of treatment of 10 minutes.

The test for adhesive bonding strength was undertaken in the same manner as in Example 1 with a one-package type RTV silicone rubber (KE 42RTV, a product by Shin-Etsu Chemical Co.) cured as sandwiched between two of the above prepared plasma-treated sheets or untreated sheets of the same VC resin composition to find that the layer of the cured RTV silicone rubber became broken at a tension of 18.3 kg/cm$^2$ while the adhesive bonding strength was 2.8 kg/cm² with the untreated sheets.

EXAMPLE 5

A blend composed of 100 parts of a VC resin (TK-1300), 40 parts of dioctyl phthalate, 1.5 parts of zinc stearate and 1.5 parts of calcium stearate was milled in a roller mill at 165° C. for 10 minutes and then fabricated into a sheet of 1 mm thickness with a press at 170° C.

The sheet was placed in the same apparatus for plasma generation as used in Example 1 and the surface was treated with low temperature plasma similarly but with argon as the plasma gas, a pressure of 0.2 Torr, a power of 500 watts and a time of treatment of 5 minutes.

The organopolysiloxane composition tested was a two-package type RTV silicone rubber composition (KE 119RTV, a product of Shin-Etsu Chemical Co.) admixed with 10% by weight of a curing catalyst (Catalyst RP, a product of Shin-Etsu Chemical Co.) and the adhesive bonding test was carried out in the same manner as in Example 1 to find that the strength with the plasma-treated sheet was 35 kg/cm² while the strength with an untreated sheet of the same VC resin was 3.0 kg/cm² when no primer was used but 11.9 kg/cm² when the surface of the VC resin sheet was treated in advance with a primer (Primer T, a product of Shin-Etsu Chemical Co.).

EXAMPLE 6

A blend composed of 100 parts of a VC resin with an average degree of polymerization of about 1000 (TK-1000, a product of Shin-Etsu Chemical Co.), 1 part of dibutyltin mercaptide and 0.2 part of calcium stearate was milled on a roller mill at 170° C. for 10 minutes and then fabricated into a sheet of 1 mm thickness with a press at 175° C.

The sheet was placed in the same apparatus for plasma generation as used in Example 1 and the surface of the sheet was treated with low temperature plasma similarly but with argon as the plasma gas, a pressure of 0.8 Torr, a power of 500 watts and a time of treatment of 3 minutes.

The surface of the thus plasma-treated VC resin sheet was coated with a silicone varnish curable at room temperature (KR-254, a product of Shin-Etsu Chemical Co.) with admixture of butyl titanate catalyst and kept standing at room temperature for 7 days to cure the silicone varnish. In parallel with the above, a similar silicone varnish-coated VC resin sheet was prepared with the same VC resin sheet before the treatment with low temperature plasma.

These silicone varnish-coated VC resin sheets were subjected to the cross cut test by use of an Erichsen tester to find that the adhesive bonding of the cured silicone varnish was complete to the surface of the plasma treated sheet with no peeling while the varnish film on the untreated VC resin sheet became peeled in 70% portions.

EXAMPLE 7

A blend composed of 100 parts of a copolymeric resin of VC and vinyl acetate (SC-500T, a product of Shin-Etsu Chemical Co.), 1 part of dibutyltin mercaptide and 0.2 part of calcium stearate was milled on a roller mill at 160° C. for 10 minutes and then fabricated into a sheet of 1 mm with a press at 165° C.

The sheet was placed in the same apparatus for plasma generation as used in Example 1 and the surface of the sheet was treated with low temperature plasma similarly but with nitrogen as the plasma gas, a pressure of 0.1 Torr, a power of 500 watts and a time of treatment of 1 minute.

The cross cut test for the adhesion of a cured silicone varnish film on the surfaces of the thus plasma-treated sheet and untreated sheet was carried out by use of an Erichsen tester with the test specimens coated with a room temperature curable urethane-modified silicone varnish (KR-302, a product of Shin-Etsu Chemical Co.) and kept standing at room temperature for 7 days to cure the silicone varnish.

The adhesive bonding of the cured silicone varnish was complete on the surface of the plasma-treated sheet with no peeling while the cured film of the silicone varnish on the untreated sheet became peeled in 80% portions.

What is claimed is:

1. Method of making a shaped polymeric article composed of a homopolymer of vinyl chloride or a copolymer of vinyl chloride and vinyl acetate having a covering layer of a cured organopolysiloxane composition which comprises: (a) subjecting the shaped polymeric article to a treatment with low temperature plasma of a gas, having no polymerizability in the plasma condition, selected from the group consisting of argon, carbon monoxide, oxygen and nitrogen and mixtures thereof, the pressure of the gas being in the range of 0.001 Torr to 10 Torr, for a time of about 1 minute to about 10 minutes; (b) providing a covering layer of a curable organopolysiloxane composition onto the surface of the shaped article having been subjected to the treatment with low temperature plasma, said organsiloxane composition being curable at a temperature at which vinyl chloride resin undergoes no thermal degradation, and (c) subjecting the shaped article with the covering layer of the curable organopolysiloxane composition to curing at room temperature of the curable organopolysiloxane composition.

2. The method as claimed in claim 1, wherein the power applied in the plasma treatment is from about 50 Watts to about 500 Watts.

3. Method according to claim 1, wherein said homopolymer is composed of 100 parts by weight of vinyl chloride with a degree of polymerization of 1300, 50 parts by weight of dioctyl phthalate, 2 parts by weight of calcium stearate and 2 parts by weight of zinc stearate.

4. Method according to claim 1 wherein said homopolymer is composed of 100 parts by weight of vinyl chloride resin, 3 parts by weight of calcium stearate, 0.2 parts by weight of stearic acid.

5. Method according to claim 1, wherein said copolymer is composed of 88% (mole) vinylchloride resin and 12% (mole) vinyl acetate, the total resin being 100 parts by weight, 3 parts by weight Ca stearate and 0.2 part by weight stearic acid.

6. Method according to claim 1, wherein said homopolymer is composed of 100 parts by weight of vinyl chloride resin, 40 parts by weight of dioctyl phthalate, 3 parts by weight of Calcium stearate and 0.1 part by weight of stearic acid.

7. Method according to claim 1, wherein said homopolymer is composed of 100 parts by weight of vinyl chloride resin, 40 parts by weight of dioctyl phthalate, 1.5 parts by weight of zinc stearate, 1.5 parts by weight of calcium stearate.

8. Method according to claim 1, wherein said homopolymer is composed of 100 parts by weight of vinyl chloride resin, 1 part by weight of dibutyl tin mercaptide, and 0.2 part of Calcium stearate.

9. Method according to claim 1, wherein said copolymer is composed of 100 parts by weight of a vinyl chloride and vinyl acetate copolymer copolymerized in ratio of 88 molar percent to 12 molar percent respectively, 1 part by weight of dibutyl tin mercaptide and 0.2 parts by weight of Calcium stearate.

* * * * *